United States Patent [19]
Yamaguchi et al.

[11] Patent Number: 4,907,089
[45] Date of Patent: Mar. 6, 1990

[54] TIMING PULSE GENERATOR
[75] Inventors: Masanori Yamaguchi; Maki Sato, both of Kanagawa, Japan
[73] Assignee: Sony Corp., Tokyo, Japan
[21] Appl. No.: 297,553
[22] Filed: Jan. 13, 1989
[30] Foreign Application Priority Data
Jan. 14, 1988 [JP] Japan .................................. 63-006202
Jan. 14, 1988 [JP] Japan .................................. 63-006203
[51] Int. Cl.⁴ .............................................. H04N 3/14
[52] U.S. Cl. ............................ 358/213.31; 358/213.26
[58] Field of Search ....................... 358/213.26, 213.29, 358/213.31, 212, 909, 213.11; 328/63

[56] References Cited
U.S. PATENT DOCUMENTS 4,167,754  9/1979  Nagumo et al. ................ 358/213.26
4,423,383 12/1983  Svendsen ............................ 328/63
4,723,169  2/1988  Kaji ................................ 358/213.26
4,742,395  5/1988  Nagai et al. ..................... 358/213.26
4,796,095  1/1989  Shimada .............................. 328/63

Primary Examiner—Jin F. Ng
Assistant Examiner—Stephen Brinich
Attorney, Agent, or Firm—Alvin Sinderbrand

[57] ABSTRACT

A timing pulse generator for generating timing pulses exhibiting vertical and horizontal scanning frequencies of the type found in video signals, particularly adapted for use with a CCD imaging device. A first counter counts reference pulses having the horizontal scanning frequency to produce address counts that are used to read out timing pulse data stored in a first ROM, the read out data constituting a portion of the timing pulses. A second counter counts reference pulses of a frequency substantially higher than the horizontal scanning frequency to produce second address counts which are used to read out pulse data stored in a second ROM, the read out data constituting another portion of the timing pulses. Two separate ROMs are used to produce timing pulses of the horizontal and vertical scanning frequencies for driving and reading image data from the CCD device.

13 Claims, 11 Drawing Sheets

FIG. 3
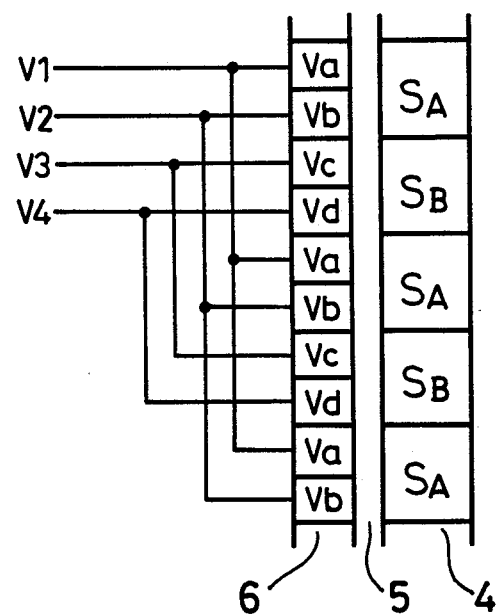
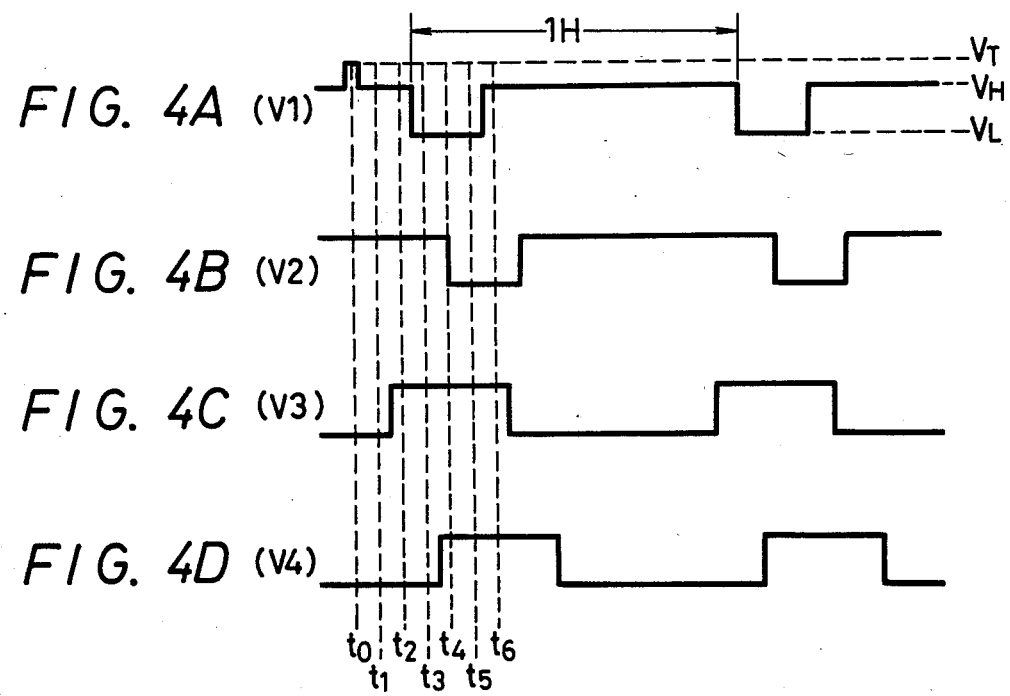
FIG. 4A (V1)
FIG. 4B (V2)
FIG. 4C (V3)
FIG. 4D (V4)

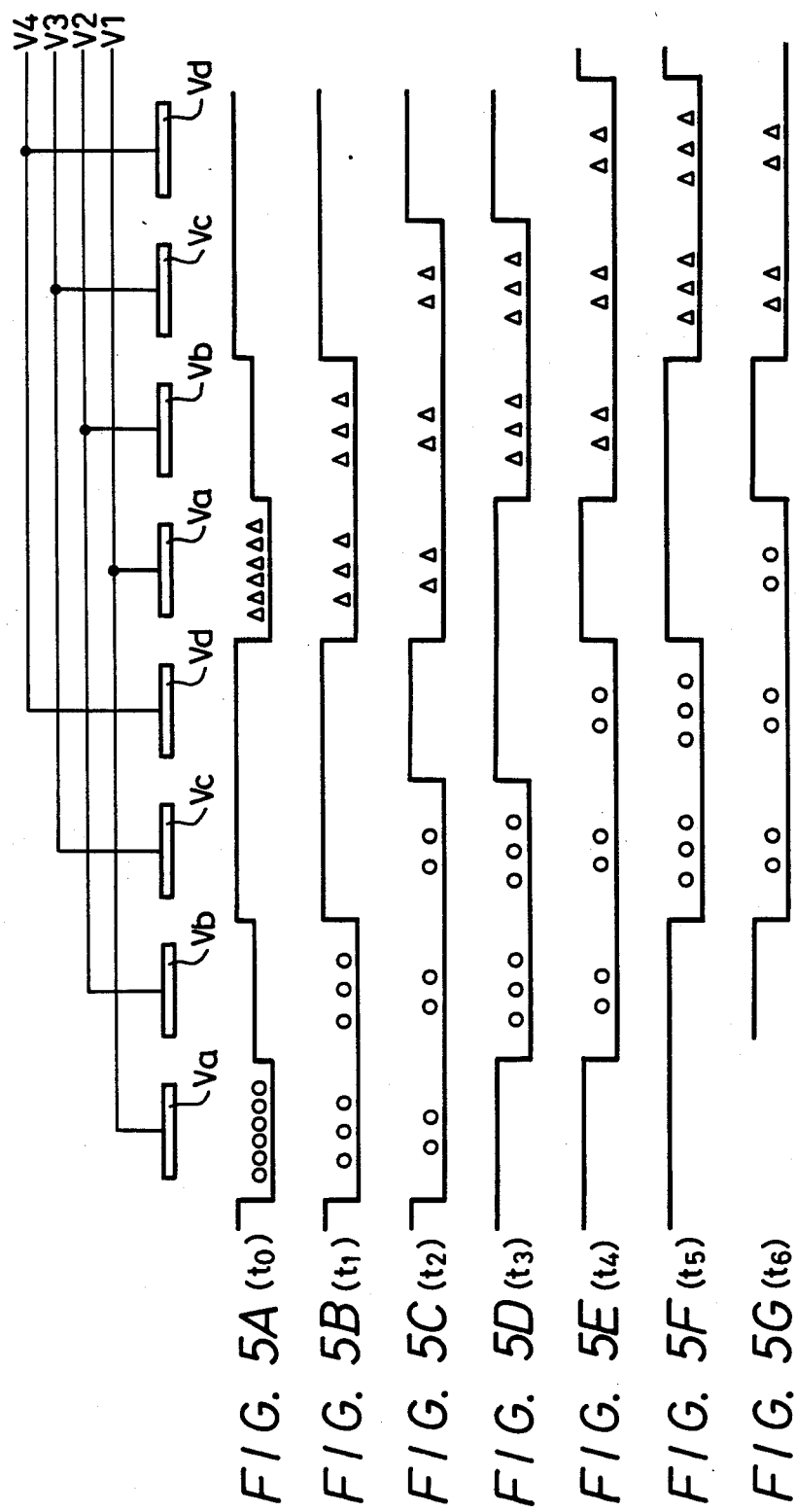

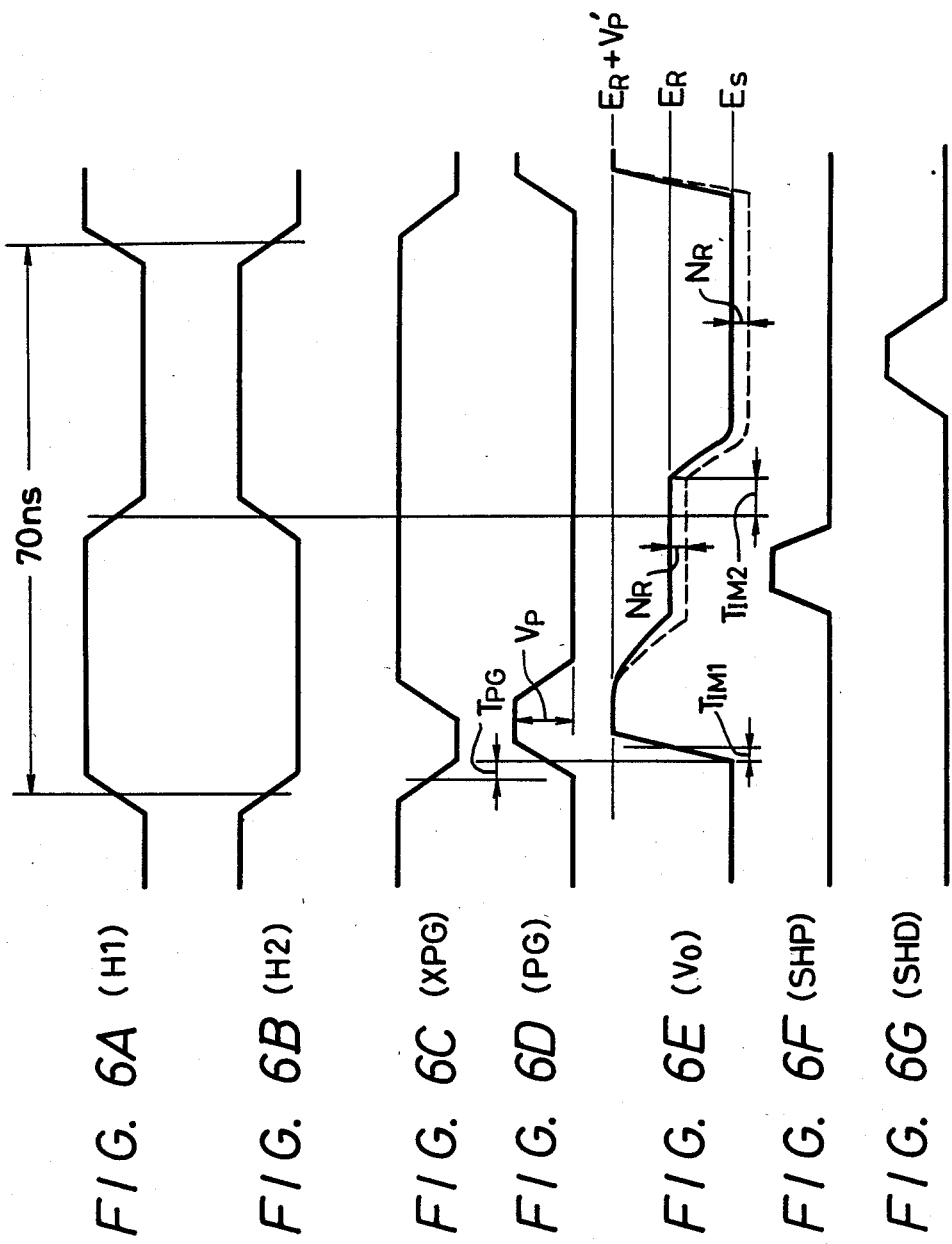

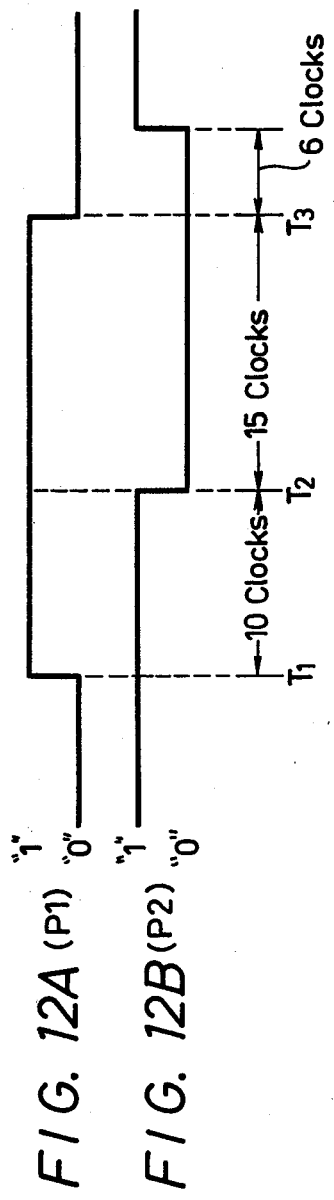
FIG. 12A (P1)  FIG. 12B (P2)  FIG. 13  FIG. 14

TIMING PULSE GENERATOR

BACKGROUND OF THE INVENTION

1. Field of the Invention

This invention relates to timing pulse generating circuits and, more particularly, to a timing pulse generator having particular utility in controlling the operation of a CCD imaging device.

2. Description of the Prior Art

In one type of video imaging device formed as a charge coupled device (CCD) solid-state imager, charges accumulated in strips or bands of light receiving material are transferred to a vertical shift register at the usual horizontal scanning frequency (or horizontal repetition rate). Once transferred to the vertical shift register, the charges, which represent the intensity of a video image, are transferred one line at a time at the horizontal repetition rate, to a horizontal shift register. Then, during a horizontal line interval, the charges in the horizontal shift register are shifted out at a high rate to a charge detecting element which, in turn, supplies successive voltage samples to a storage capacitor from which those successive samples are transferred to a sample-and-hold output circuit to supply successive samples of a respective line in a video image.

For proper operation of the CCD imaging device and its associated sample-and-hold output circuit, a variety of timing pulses having several different repetition rates, pulse durations and phases are used. For example, so-called horizontal transfer pulses having a frequency on the order of $4f_{sc}$, wherein $f_{sc}$ is the frequency of the NTSC chrominance subcarrier, $2f_{sc}=455f_H$, and $f_H$ is the horizontal repetition rate, are generated to shift the charges through the horizontal shift register. Also, four separate phases of vertical shift clock pulses, each having the horizontal scanning frequency $f_H$, are produced to shift the imaging charges through the vertical shift register to the horizontal shift register. Charge image transfer pulses having the vertical scanning frequency $f_V$ are used to transfer charges from the light receiving pick-up strips to the vertical shift register. Reset pulses of a frequency equal to $4f_{sc}$ are used to reset the capacitor on which each image charge is stored temporarily; and sampling pulses also of the frequency $4f_{sc}$ are used for the sample and hold operation whereby successive voltage samples corresponding to the image charges are generated by the sample-and-hold output circuit.

A timing pulse generator may be constructed as a discrete logic device, typically in the form of an integrated circuit, to generate the aforenoted diverse timing pulses. The frequency and phase relationship of these timing pulses thus are uniquely determined by the arrangement of the logic circuit from which the timing pulse generator is constructed. In the event of any differences in the frequency and/or phase relationships from one timing pulse generator to another (that is, in the event of any "scattering" of the characteristics of such generators), corrections such as phase adjustments heretofore have been attained by redesigning the entire logic circuit forming the timing pulse generator. Such redesign often is not a simple task.

To minimize circuit redesigning, it has been proposed to use a read only memory (ROM) which is addressed at relatively high speed and which stores data bits at each addressable location corresponding to the data levels of the different timing pulses at successive clock instants. For example, if each addressable location of the ROM stores a 4-bit signal, then bit 0 represents the data level at any instant of time of a first timing pulse, bit 1 represents the data level at those same instants of time of a second timing pulse, bit 2 represents the data level of a third timing pulse and bit 3 represents the data level of a fourth timing pulse. If the ROM is addressed in sequence, the 4-bit data at each addressed location is a direct indication of the change in the level of each timing pulse. Of course, the frequency at which the ROM is addressed determines the frequency of the timing pulses; and any output bit read from the ROM may be monitored so as to constitute the corresponding timing pulse.

One drawback of using a ROM to generate a variety of timing pulses is the large capacity needed to store the data bits representing the levels of those timing pulses. For example, in the NTSC system $2f_{sc}=455f_H$ and there are 525 lines per frame. Accordingly, an address counter used with a ROM to generate timing pulses should be able to count at least $455 \times 525 = 238,875$ bits. If N timing pulses are to be generated by the ROM, the ROM must have a capacity of $N \times 238,875$ bits. Hence, the address counter must be an 18-bit counter and the ROM must have a storage capacity of $2^{18}$ addressable locations. The use of a large capacity ROM and a large-scale address counter is a significant contribution to the cost and complexity of a timing pulse generator. Thus, a large capacity ROM and a large-scale counter is not desirable.

OBJECTS AND SUMMARY OF THE INVENTION

Therefore, it is an object of the present invention to provide an improved timing pulse generator which avoids the aforenoted disadvantages and drawbacks of previously proposed generators.

Another object of this invention is to provide a timing pulse generator which can be used with a CCD imaging device and which may be constructed with one or more relatively low capacity ROMs.

A further object of this invention is to provide a timing pulse generator formed as an integrated circuit whose fabrication can be easily and inexpensively modified if phase adjustments in any of the timing pulses are needed.

An additional object of this invention is to provide an improved, inexpensive timing pulse generator using separate addressable ROMs to product timing pulses of relatively higher and lower frequencies.

Various other objects, advantages and features of the present invention will become readily apparent from the ensuing detailed description, and the novel features will be particularly pointed out in the appended claims.

In accordance with this invention, a timing pulse generator is provided for generating at least first and second timing pulses exhibiting vertical and horizontal scanning frequencies, respectively, of the type normally found in video signals. The timing pulses are adapted for use with a CCD imaging device and are generated by a first ROM which is addressed by a first address counter that counts reference pulses having the horizontal scanning frequency to read out timing pulse data stored in the respectively addressed locations. A second ROM is addressed by a second address counter that counts reference pulses of a frequency substantially higher than the horizontal scanning frequency to read out timing pulse data stored in respectively addressed locations. The read out timing pulse data constitutes the first and second timing pulses.

As one aspect of this invention, the second ROM is comprised of a data ROM for storing data information representing data levels of timing pulses at respective clock instants, and an interval ROM for storing interval information representing the durations of respective intervals between transitions in the data levels of the timing pulses. The address counter is comprised of an interval counter for counting the number of reference pulses included in an interval duration read from the interval ROM, and a ROM address counter incremented each time the interval counter counts the aforementioned umber of reference pulses, for addressing both the interval ROM and the data ROM. The interval information read from the addressed interval ROM establishes the interval duration at which the ROM address counter next is incremented; and the data information read from the addressed data ROM establishes respective data levels in the timing pulses.

In one embodiment, the aforementioned interval counter is comprised of a presettable counter preset to a count determined by the interval information read from the interval ROM and adapted to count the reference pulses from the preset count to produce a carry output which is used to increment the ROM address counter.

In an alternative embodiment, the aforementioned interval counter is comprised of a comparator for comparing the count of the interval counter to a count corresponding to the interval information read from the interval ROM so as to produce an output pulse when the compared counts are equal (or otherwise correspond to each other), thereby incrementing the ROM address counter and resetting the interval counter.

In accordance with yet another embodiment, each of the ROMs used to generate the first and second timing pulses is comprised of a data ROM for storing bits representing timing pulse data levels at respective clock instants, and each ROM address counter is selectively enabled to count reference pulses only during predetermined intervals which precede and follow transitions in the timing pulses. Thus, the capacity of each ROM and each address counter is substantially reduced.

As another aspect of this invention, a phase shift circuit is provided to impart a phase shift to at least some of the timing pulses. Preferably, the phase shift circuit is comprised of a series of logic inverter circuits, each exhibiting an inherent propagation delay thereby producing a phase shift equal to the sum of the individual delays.

As a feature of this aspect, the timing pulse generator is formed as an integrated circuit having a common substrate and multi-layer interconnections, and the series of logic inverter circuits is provided with interconnections between the individual circuits formed as the topmost layer of the integrated circuit. Accordingly, a change in the series connection of logic inverter circuits, thereby adjusting the phase shift produced thereby, is achieved by changing the mask used to fabricate the topmost layer.

As yet another feature of this invention, an output amplifier for the timing pulses is formed on the common substrate and is connected to the aforementioned series of logic inverter circuits.

BRIEF DESCRIPTION OF THE DRAWINGS

The following detailed description, given by way of example and not intended to be limited solely to the embodiments described herein, will best be understood in conjunction with the accompanying drawings in which:

FIG. 3 is a schematic representation of a portion of a CCD imaging device;

FIGS. 4A-4D are timing waveforms useful in understanding the operation of a vertical shift register shown in FIG. 3;

FIGS. 5A-5G are waveform diagrams of clock signals used to transfer charges in the vertical shift register shown in FIG. 3;

FIGS. 6A-6G are waveform diagrams useful in understanding the operation of the horizontal shift register provided in the CCD imaging device;

FIGS. 12A and 12B are waveform diagrams useful in understanding the operation of the circuit shown in FIG. 11;

FIG. 13 is a table which represents the manner in which interval data is stored and read from ROM 653' in FIG. 11;

FIG. 14 is a table which represents the manner in which pulse level data is stored and read from ROM 654' in FIG. 11;

DETAILED DESCRIPTION OF PREFERRED EMBODIMENTS

Application with a CCD Imaging Device

Figure 1:
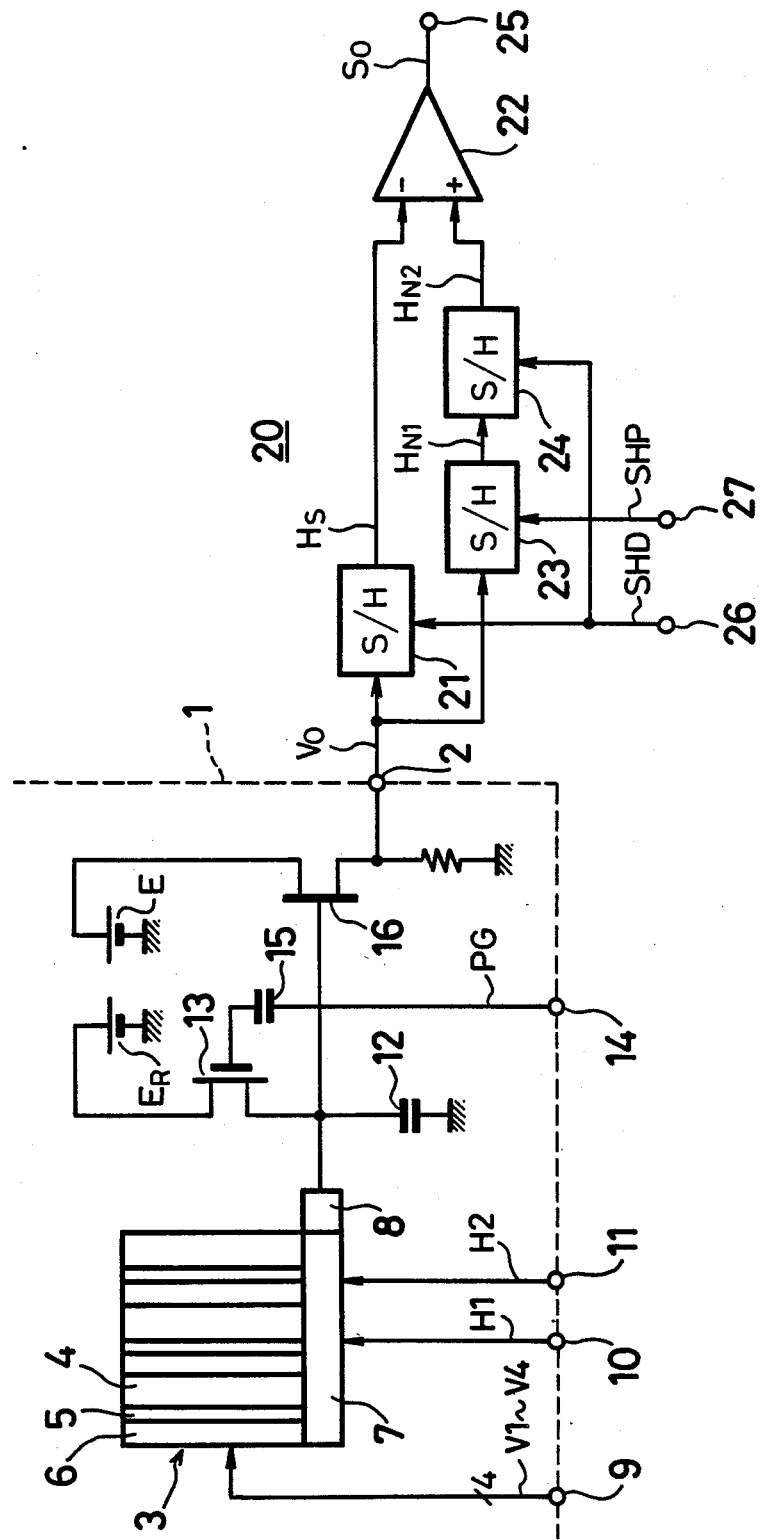
FIG. 1 is a partial block, partial schematic diagram of a CCD imaging device with which the present invention finds ready application.

One example of a CCD imaging device with which the present invention may be used is illustrated in FIG. 1. CCD device 1 (shown within broken lines) is of the so-called interline transfer type and produces an output voltage $V_0$ at output terminal 2, this voltage being comprised of line-by-line successive samples of a line interval of an image projected onto the CCD device. CCD device 1 includes a solid-state CCD image pick-up element 3 comprised of vertical strips formed of light receiving material 4, a transfer gate 5 and a vertical shift register 6, these elements being arranged alternately and repeatedly as illustrated. As an example, 910 strips 4 may be included in image pick-up element 3.

The image pick-up element also includes a horizontal shift register 7 and a charge detecting output 8 coupled to the horizontal shift register.

It is recognized that a vertical shift register 6 is coupled in charge-transferring relationship to a respective light receiving strip 4. Each vertical shift register is supplied with a four-phase vertical shift clock pulse identified as vertical shift clock pulses V1–V4 supplied from a terminal 9. The frequency of each of vertical shift clock pulses V1–V4 is equal to the horizontal scanning frequency $f_H$, but the respective vertical shift clock pulses exhibit different phases, as shown by the waveforms of FIGS. 2K–2N. The purpose of these vertical shift clock pulses is to transfer the charges received from a horizontal line (or row) across light receiving strips 4 to horizontal shift register 7 on a line-by-line basis. Once a line of charges is shifted into horizontal shift register 7, that line of charges is shifted out sequentially to charge detecting output 8. As an example, at the repetition rate of the horizontal scanning frequency, a line of charges, that is, packets of charges produced by light receiving strips 4, are shifted into horizontal shift register 7 and then shifted out before the next line of charges is so transferred.

Figure 2:
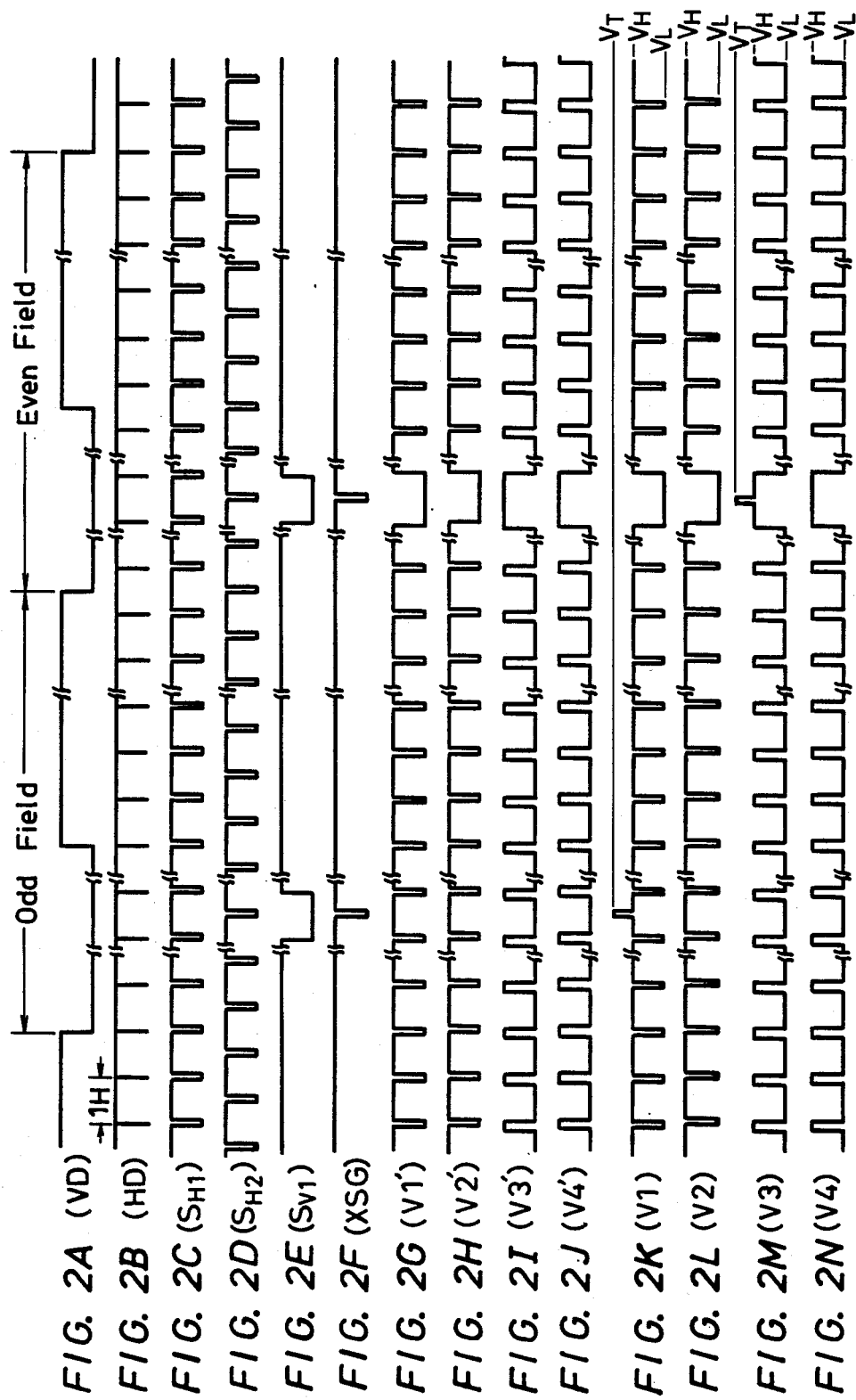
FIGS. 2A-2N are timing diagrams of the various timing pulses used to drive the CCD imaging device.

As will be described further below, consistent with the NTSC interlace arrangement, the charges produced in the odd lines across light receiving strips 4 are transferred to vertical shift register 6 at the beginning of an odd video field; and the charges produced by the even lines across light receiving strips 4 are transferred to vertical shift register 6 at the beginning of an even video field. As shown in FIG. 2K, vertical shift clock pulse V1 is a ternary signal having an extra high value $V_T$ produced during the vertical blanking interval of the odd field so as to transfer the charges in all of the odd lines across light receiving strips 4 to vertical shift register 6. Likewise, vertical shift clock pulse V3 is a ternary level signal (shown in FIG. 2M) having an extra high value $V_T$ which transfers the charges produced in all of the even lines across light receiving strips 4 to vertical shift register 6 during the vertical blanking interval of an even field. Vertical shift clock pulses V2 and V4 are shown in FIGS. 2L and 2N, respectively, and are seen to be binary level signals whose excursions are from a high level of $V_H$ to a low level of $V_L$. FIG. 2A illustrates a vertical synchronizing signal VD and FIG. 2B illustrates a horizontal synchronizing signal HD, normally provided by suitable synchronizing signal generators used with image pick-up devices.

A schematic representation of one section, or repeat pattern, of image pick-up element 3 is illustrated in FIG. 3. A light receiving strip 4 is illustrated as being divided into odd and even lines of light receiving elements $S_A$ and $S_B$, respectively, these odd and even lines alternating along the entire length of the light receiving strip. Vertical shift register 6 is spaced from light receiving strip 4 by transfer gate 5; and the vertical shift register is comprised of four electrodes $V_a$, $V_b$, $V_c$ and $V_d$, the pitch of electrodes $V_a$–$V_d$ being equal to the pitch of elements $S_A$–$S_B$. In the schematic illustration, the pitch of individual vertical shift register electrodes is half that of individual light receiving elements. Vertical shift register electrodes $V_a$ and $V_b$ are opposite light receiving element $S_A$ and vertical shift register electrodes $V_c$ and $V_d$ are opposite light receiving element $S_B$. Image pick-up device 3 having the construction schematically illustrated in FIG. 3 is known as a frame-read CCD.

Vertical shift clock pulses V1–V4 are supplied to vertical shift register electrodes $V_a$–$V_d$, respectively. FIGS. 4A–4D are waveform diagrams of one illustrative cycle of these vertical shift clock pulses. As will be described, a packet of charges, referred to as signal charges, produced by light receiving element $S_A$ first is transferred to vertical shift register electrode $V_a$, and then these signal charges are shifted sequentially through electrodes $V_b$, $V_c$, $V_d$, $V_a$, $V_b$, etc. In particular, at time $t_0$, the extra high ternary value $V_T$ of vertical shift clock pulse V1 shifts the signal charges produced by light receiving element $S_A$ to electrodes $V_a$. Then, at time $t_1$, the high level $V_H$ of vertical shift clock pulses V1 and V2 serves to distribute the signal charges from electrode $V_a$ to electrodes $V_a$ and $V_b$. Thereafter, the high value $V_H$ of clock signals V1, V2 and V3 distributes these signal charges to electrodes $V_a$, $V_b$ and $V_c$. At time $t_3$, the low level $V_L$ of clock pulse V1 and the high value $V_H$ of clock pulses V2 and V3 serve to concentrate the signal charges at electrodes $V_b$ and $V_c$. The further changes in the levels of the vertical clock pulses continue to distribute and concentrate the charges at successive electrodes, thereby shifting the charges downwardly along the vertical shift register.

FIGS. 5A–5H represent the manner in which the signal charges shift through the vertical shift register. At time $t_0$, also shown in FIGS. 4A–4D, the potential well under electrode $V_a$ is a maximum because of the extra high value $V_T$ of vertical shift clock pulse V1. From FIGS. 2A and 2K, it is seen that this potential well is produced during the vertical blanking interval of, for example, an odd field, thereby transferring the signal charges from light receiving elements $S_A$ to electrodes $V_a$. Then, at time $t_1$, the potential wells under electrodes $V_a$ and $V_b$ are deeper than the potential wells under electrodes $V_c$ and $V_d$ because vertical shift clock pulses V1 and V2 are at their high levels $V_H$ while vertical shift clock pulses V3 and V4 are at their low levels $V_L$. Thus, as shown in FIG. 5B, the signal charges which had been transferred to electrode $V_a$ now are distributed to the potential wells under electrodes $V_a$ and $V_b$.

At time $t_2$, the potential wells under electrodes $V_a$, $V_b$ and $V_c$ are deeper than the potential well under electrode $V_d$ because vertical shift clock pulses V1, V2 and V3 exhibit their higher level $V_H$ while vertical shift clock pulse V4 exhibits its lower level $V_L$. As shown in FIG. 5C, the signal charges which had accumulated in potential wells under electrodes $V_a$ and $V_b$ now are further distributed into potential wells under electrodes $V_a$, $V_b$ and $V_c$.

At time $t_3$, vertical shift clock pulses V1 and V4 exhibit their lower levels $V_L$ while vertical shift clock pulses V2 and V3 exhibit their higher levels $V_H$. Hence, the potential wells under electrodes $V_b$ and $V_c$ are deeper than the potential wells under electrodes $V_a$ and $V_d$. Accordingly, the signal charges which had been distributed in the potential wells under electrodes $V_a$, $V_b$ and $V_c$ now are concentrated in the potential wells under electrodes $V_b$ and $V_c$, as shown in FIG. 5D. FIGS. 5E–5G illustrate the manner in which the potential wells are made deeper under electrodes $V_b$, $V_c$ and $V_d$ to distribute the charges, and then are made deeper under electrodes $V_c$ and $V_d$ to concentrate those charges, and so on. As a result, the signal charges which had been transferred to the potential well under electrode $V_a$ are shifted sequentially from electrode to electrode until those signal charges eventually are shifted into horizontal shift register 7.

The foregoing operation is repeated in an even field, whereby signal charges produced by light receiving elements $S_B$ first are transferred to the potential wells under electrodes $V_c$; and then these signal charges are shifted in the vertical direction to electrodes $V_d$, $V_a$, $V_b$, $V_c$, etc., all as represented by the waveforms illustrated in FIGS. 5B–5G.

From the foregoing, it is appreciated that a line of signal charges is shifted into horizontal shift register 7 at a repetition rate equal to the horizontal scanning frequency. These signal charges are shifted sequentially through the horizontal shift register to charge detecting output 8 before the next line of signal charges is transferred into the horizontal shift register. Horizontal shift pulses H1 and H2 are supplied to horizontal shift register 7 from terminals 10 and 11, respectively (FIG. 1). If, as an example, image pick-up device 3 includes 910 light receiving strips 4, then horizontal shift pulse H1 exhibits a repetition rate of 910 $f_H = 4f_{sc}$. Horizontal shift pulse H2 is out of phase with horizontal shift pulse H1. FIGS. 6A and 6B are waveform diagrams of these horizontal shift pulses H1 and H2, respectively. It is appreciated that each light receiving element $S_A$ and $S_B$ produces signal charges representing one pixel; and horizontal shift pulses H1 and H2 exhibit a pixel period of approximately 70 ns.

Returning to FIG. 1, charge detecting output 8 which receives signal (or pixel) charges sequentially is coupled to a capacitor 12 whereat the pixel charges are stored temporarily. Capacitor 12 is connected to the source of an FET 13 which functions to reset the voltage across a capacitor 12 to a reference level prior to transferring a pixel charge thereto. Capacitor 12 also is coupled to output terminal 2 by way of a source-follower FET 16. A reset pulse PG, shown in FIG. 6D and derived from a timing pulse XPG (FIG. 6C) is coupled to input terminal 14 by way of a pulse driver (not shown). This reset pulse PG is coupled by a capacitor 15 to the gate of FET 13 for the purpose of turning on the FET to supply a reference voltage $E_R$ through the source-drain circuit thereof to capacitor 12. From FIGS. 6A–6D, it is seen that reset pulse PG is in synchronism with horizontal shift pulses H1 and H2 and exhibits the pixel repetition rate $4f_{sc} = 910f_H$.

As illustrated in FIGS. 6D and 6E, when reset pulse PG is positive, FET 13 is turned on and capacitor 12 is charged to the reference voltage $E_R$. However, due to the gate-source capacitance of the FET, reset pulse PG is capacitively coupled to capacitor 12, resulting in a reset voltage across the capacitor depicted as $E_R + V'_P$, wherein the component $V'_P$ is the voltage attributed to the capacitive coupling of the reset pulse. This voltage component attributed to the capacitive coupling of the FET is referred to as a "jump-in" component.

As shown in FIG. 6E, when reset pulse PG terminates, the voltage across capacitor 12 falls toward reference voltage level $E_R$; but a noise component attributed to the reset operation and referred to as reset noise $N_R$ is superimposed onto this reference voltage. Thus, the reset voltage across capacitor 12 is equal to $E_R - N_R$.

Next, in approximate synchronism with the leading edge of horizontal shift pulse H2, the signal charge which had been shifted to charge detecting output 8 is coupled to capacitor 12. As a result, the voltage across the capacitor is reduced by an amount equal to this signal charge. In FIG. 6E, it is assumed that capacitor 12 now is charged to the signal voltage level $E_S$ determined by the signal charge shifted to charge detecting output 8. However, as illustrated, reset noise $N_R$ remains superimposed upon signal voltage $E_S$, resulting in an output voltage $V_0 = E_S - N_R$.

Output voltage $V_0$ provided at output terminal 2 is coupled to sample-and-hold output circuit 20 for producing an output signal $S_0$ representing the pixel charges derived from image pick-up device 3 and, as will be explained, having the superimposed reset noise $N_R$ removed from output voltage $V_0$. The sample-and-hold output circuit includes sample-and-hold circuits 21, 23 and 24 and output amplifier 22. Sample-and-hold circuit 21 is coupled to output terminal 2 and receives from an input terminal 26 sampling pulses SHD having the pixel repetition rate and occurring during the positive half cycle of horizontal shift pulse H2, as shown in FIG. 6G. The output of sample-and-hold circuit 21 is coupled to an inverting input of output amplifier 22.

Sample-and-hold circuit 23 also is coupled to output terminal 2 and receives from an input terminal 27 sampling pulses SHP having the pixel repetition rate and timed to occur during the interval that output voltage $V_0$ is at its reset level, as shown in FIG. 6F. The output sample produced by sample-and-hold circuit 23 is sampled by sample-and-hold circuit 24 whose output is, in turn, coupled to the non-inverting input of amplifier 22. Sample-and-hold circuit 24 is coupled to terminal 26 to receive the same sampling pulses SHD as are applied to sample-and-hold circuit 21.

As illustrated in FIGS. 6E–6G, sample-and-hold circuit 23 produces a signal sample $H_{N1}$ of amplitude $H_{N1} = E_R - N_R$. Sample-and-hold circuit 21 produces the signal sample $H_S = E_S - N_R$. Sample-and-hold circuit 24 samples the signal sample $H_{N1}$ from sample-and-hold circuit 23 at the same time that signal sample $H_S$ is obtained. Thus, amplifier 22 applies to output terminal 25 signal $S_0 = E_R - N_R - (E_S - N_R) = E_R - E_S$; and reset noise $N_R$ is cancelled.

Signal samples $H_S$ and $H_{N1}$ are produced by different sampling pulses SHD and SHP, respectively. As a result, jump-in pulses appear because these samples are produced by sampling pulses that occur at different times. The effect attributed to different jump-in pulses is substantially cancelled by sampling the signal sample $H_{N1}$ in sample-and-hold circuit 24 with the same sampling pulse SHD that is supplied to sample-and-hold circuit 21. Hence, the jump-in pulse produced in sample $H_{N2}$ is in-phase with the jump-in pulse produced in signal sample $H_S$. Amplifier 22 cancels these jump-in pulses and, as a result, the jump-in pulse interference is adequately suppressed.

Figure 7:
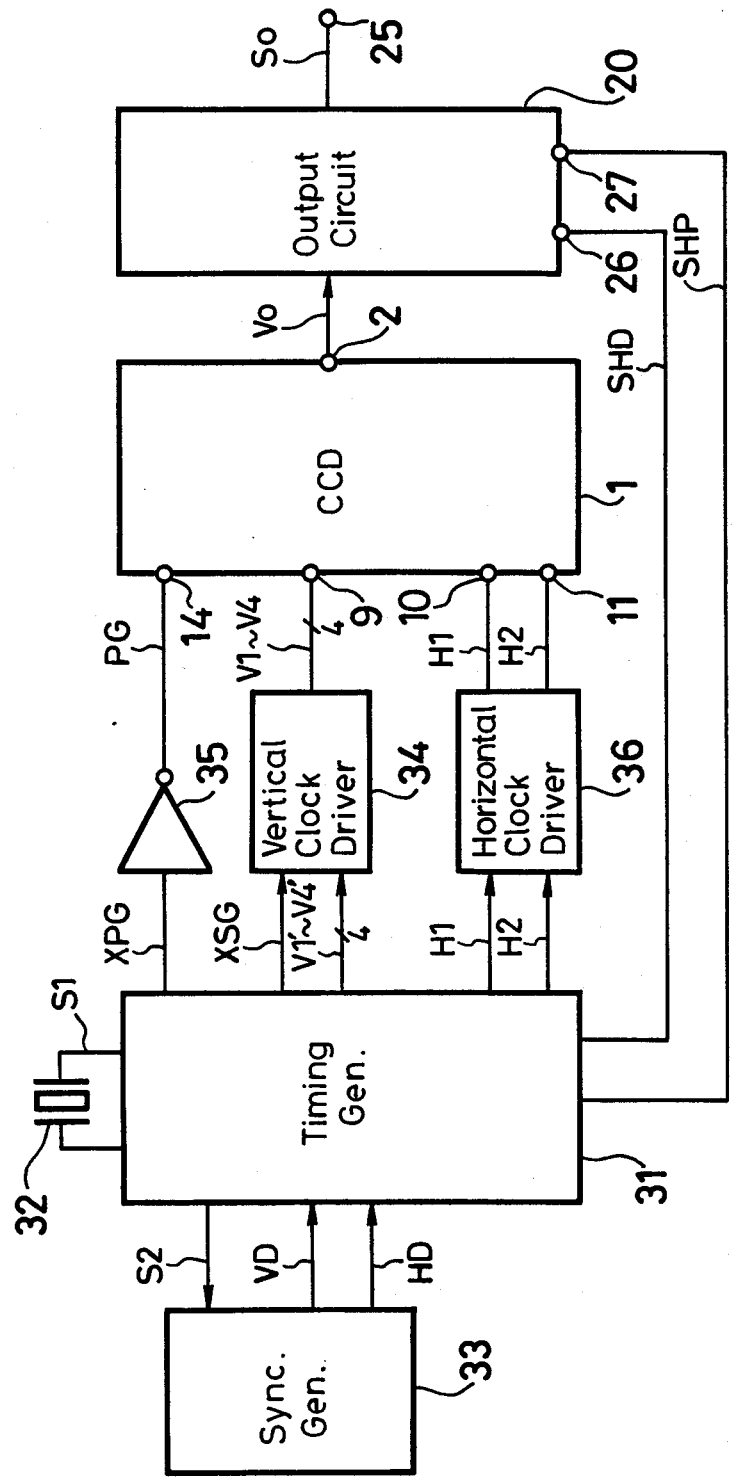
FIG. 7 is a block diagram of a driving circuit used with a CCD imaging device.

FIG. 7 is a block diagram of the clock pulse driving circuit used with CCD device 1 and sample-and-hold output circuit 20. The clock pulse driving circuit is comprised of a timing pulse generator 31, a synchronizing signal generator 33 and pulse driver circuits 34, 35 and 36. Timing pulse generator 31 is coupled to an oscillator 32, such as a quartz oscillator, for receiving a reference signal S1 having a frequency of, for example, $8f_{sc}$, wherein $f_{sc}$ is the frequency of the chrominance subcarrier in the NTSC system and is approximately 3.58 MHz. The timing pulse generator may be a logic circuit formed of counters, delay circuits, and the like and fabricated as an integrated circuit. Alternatively, and as shown by way of example in FIG. 8, the timing pulse generator may include an addressable ROM storing different multi-bit data levels in respective addressable locations, these bits forming the various timing and clock pulses indicated in FIG. 7 (and discussed above), as the ROM is addressed. In either embodiment, timing pulse generator 31 generates a signal S2 having a frequency $4f_{sc}$ which is supplied to synchronizing signal generator 33 and also is used to produce the horizontal shift pulses H1 and H2.

Synchronizing signal generator 33 may be a conventional counting circuit adapted to generate vertical synchronizing pulses VD and horizontal synchronizing pulses HD in response to signal S2. FIGS. 2A and 2B illustrate the waveforms of the vertical and horizontal synchronizing pulses VD and HD, respectively. These vertical and horizontal synchronizing pulses are supplied to the timing pulse generator for use in producing the vertical shift clock pulses V1'-V4' (shown in FIGS. 2G-2J) and pulse signal XSG (shown in FIG. 2F) which is used to obtain the extra high ternary level $V_T$ for the vertical shift clock pulses V1 and V3 (FIGS. 2K and 2M). Pulse signal XSG is used as a sensor gate signal to control gate 5 of image pick-up element 3 for transferring to vertical shift register 6 the pixel charges produced by light receiving elements $S_A$ and $S_B$, described above.

Sensor gate signal XSG and vertical shift clock pulses V1'-V4' are coupled to clock driver 34 which amplifies the power level of these pulses and combines sensor gate signal XSG with vertical shift clock pulses V1' and V3', resulting in vertical shift clock pulses V1-V4 (FIGS. 2K-2N). The power level of vertical shift clock pulses V1-V4 is sufficient to drive vertical shift register 6 of CCD device 1 in the manner discussed above.

Timing pulse generator 31 also generates pulse XPG, shown in FIG. 6C, from which reset pulse PG is derived. Pulse XPG is coupled to pulse driver 35 which, as depicted in FIG. 7, functions as an inverter. Hence, reset pulse PG is of sufficient amplitude and polarity to reset capacitor 12 (FIG. 1).

The power levels of horizontal shift pulses H1 and H2 produced by the timing pulse generator are increased by pulse driver 36. These horizontal shift pulses from pulse driver 36 have been discussed above in conjunction with FIGS. 6A and 6B are used to shift pixel charges through horizontal shift register 7.

Finally, timing pulse generator 31 generates sampling pulses SHD and SHP, discussed above. These sampling pulses are supplied to terminals 26 and 27 of sample-and-hold output circuit 20 which samples output voltage $V_O$ produced by CCD device 1 so as to form video signal samples $S_O$ of the pixels constituting each horizontal line interval.

The various timing pulses supplied to CCD device 1 exhibit time delays attributed to the pulse driver circuits and to the CCD device itself. As shown in FIGS. 6C and 6D, a time delay $T_{PG}$ between pulse XPG and reset pulse PG is caused by the inherent propagation delay of inverter driver 35. In FIG. 6E, the time delays $T_{IM1}$ and $T_{IM2}$ are attributed to the inherent delay in shifting charges through CCD device 1. If the timing pulse generator is formed as a discrete logic circuit fabricated as an integrated circuit, the aforementioned time delays attributed to the pulse drivers and to the CCD device can be compensated by redesigning the logic circuit. However, since such time delays may vary over a broad range from one CCD device to another, customized redesigning is quite expensive and not readily an acceptable solution.

Figure 8:
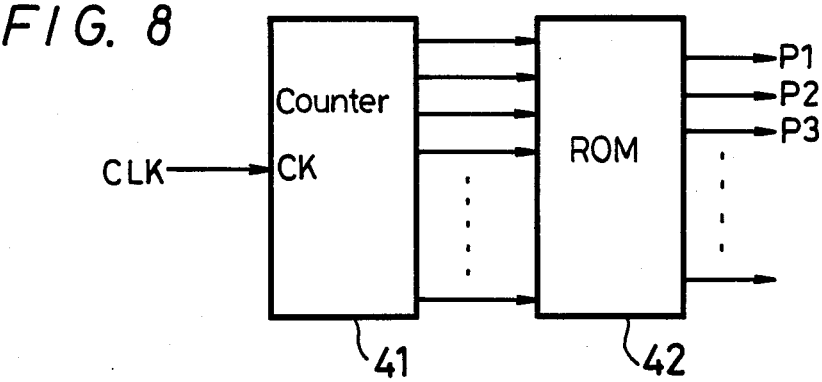
FIG. 8 is a block diagram of a prior art timing pulse generator which uses a ROM.

Accordingly, it has been proposed to incorporate into the timing pulse generator an addressable ROM, such as shown in FIG. 8. By using a ROM, phase adjustments in the timing pulses can be achieved simply by re-programming the ROM, for example, by changing the locations in which there is a bit value change. Such re-programming is far simpler than redesigning a logic circuit. FIG. 8 illustrates various timing pulses P1, P2, P3, etc. read from a ROM 42 in response to address counts produced by an address counter 41 which, in turns, counts clock pulses supplied to the counter. It is appreciated that, as the count of counter 41 increments, successive addresses are generated and the contents of each addressed location are read from ROM 42. Outputs p1, P2, etc. may receive corresponding bits read from each addressed location; and as the level of a bit changes from one address location to another, a transition is produced at that output. Hence, each illustrated output provides a respective pulse signal whose level is determined by the data bit read from the ROM. When using a common ROM to producing timing pulses of diverse repetition rates, such as pulses XPG and vertical shift clock pulses V1'-V4', it had been thought that the capacity of ROM 42 should be sufficiently high to accommodate these different repetition rates. For example, the frequency of the clock pulses CLK supplied to counter 41 should be sufficient to produce timing pulses having a frequency that is a high multiple of the horizontal scanning frequency $f_H$ as well as a frequency that is a submultiple of the vertical scanning frequency $f_V$. In the NTSC system where $2f_{sc}=455f_H$ and one video frame is comprised of 525 lines, if the frequency of the clock signal CLK is $2f_{sc}$, then it had been thought that counter 41 should be capable of achieving a count at least equal to $455 \times 525 = 238,875$; and ROM 42 likewise should have at least 238,875 addressable storage locations. If ROM 42 is to generate N different timing pulses, then each storage location should store N bits. Hence, ROM 42 was thought to require a bit storage capacity of $N \times 238,875$. Therefore, counter 41 had to be an 18-bit counter to be able to achieve a count of $2^{18}=262,144$. As is more likely, ROM 42 should have a number of storage locations equal to the number of pixels included in a video frame, or $910 \times 525 = 477,750$ storage locations. Accordingly, to accommodate such a ROM, counter 41 would have to be a 19-bit counter.

Regardless of whether ROM 42 should have $455 \times 525$ storage locations or $910 \times 525$ storage locations, it is recognized that the embodiment shown in FIG. 8 requires a ROM of extremely high capacity in combination with a large-scale counter. Such devices are quite expensive to fabricate and are not readily available.

The Timing Pulse Generator

Figure 9:
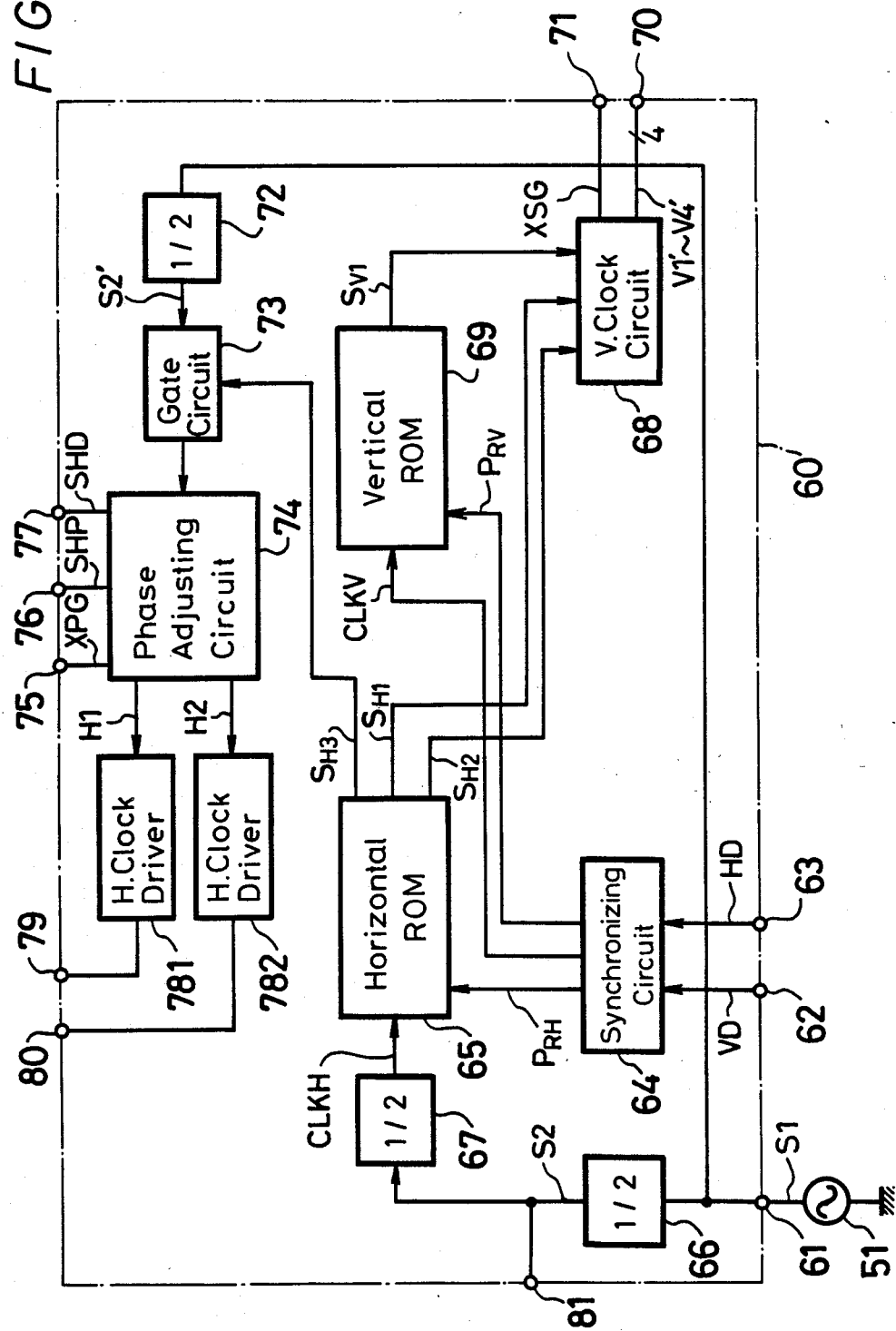
FIG. 9 is a block diagram of a preferred embodiment of the timing pulse generator in accordance with the present invention.

Referring now to FIG. 9, there is illustrated one embodiment of a timing pulse generator 60, preferably fabricated as an integrated circuit, adapted to supply CCD device 1 and sample-and-hold output circuit 20 with the very same timing pulses as are generated by timing pulse generator 31 of FIG. 7. In the preferred embodiment shown in FIG. 9, the aforenoted disadvantages associated with a logic circuit or with a high capacity ROM are avoided.

Timing pulse generator 60 is comprised of two separate ROMs: a horizontal ROM 65 adapted to produce timing pulses having the relatively higher horizontal scanning frequency and a vertical ROM 69 adapted to produce timing pulses of the relatively lower vertical scanning frequency. As will be described, each ROM also includes an address counter supplied with clock signals for generating successive ROM addresses.

Timing pulse generator 60 includes an input terminal 61 adapted to be coupled to a source 51 of relatively high frequency clock pulses S1. As an example, clock pulses S1 may exhibit a frequency on the order of $8f_{sc}$. Input terminal 61 is coupled through a divide-by-two frequency divider 66 to an output terminal 81, and the frequency-divided signal is further coupled to yet another divide-by-two frequency divider 67. The output of frequency divider 67 is supplied as a clock signal CLKH to horizontal ROM 65.

A synchronizing circuit 64 also is included in timing pulse generator 60 and is coupled to input terminals 62 and 63 to receiver vertical and horizontal synchronizing pulses, respectively. The vertical synchronizing pulse VD is shown in FIG. 2A and the horizontal synchronizing pulse HD is shown in FIG. 2B. These pulses are generated by conventional means (not shown) typical of video signal generators, and further description thereof need not be provided. The synchronizing circuit functions as a gating circuit to generate a horizontal reset pulse $P_{RH}$ of a frequency equal to the horizontal scanning frequency $f_H$ and which functions to reset the address generator included in horizontal ROM 65. Synchronizing circuit 64 also generates a vertical reset pulse $P_{RV}$ of the vertical scanning frequency $f_V$ and adapted to reset the address generator included in vertical ROM 69. As also shown in FIG. 9, the synchronizing circuit generates a clock pulse CLKV of a frequency equal to the horizontal scanning frequency $f_H$ and supplied to and counted by the vertical ROM address counter.

A vertical clock circuit 68 is included in timing pulse generator 60 and is supplied with the timing pulses $S_{V1}$ generated by vertical ROM 69 and also with the timing pulses $S_{H1}$ and $S_{H2}$ generated by horizontal ROM 65. Timing pulses $S_{H1}$ and $S_{H2}$ are illustrated in FIGS. 2C and 2D, respectively, and are seen to have frequencies equal to the horizontal scanning frequency $f_H$. Timing pulse $S_{V1}$ is illustrated in FIG. 2E and is seen to have the vertical scanning frequency $f_V$. Clock circuit 68 may be comprised of conventional gating and counting circuits for combining the timing pulses $S_{H1}$, $S_{H2}$ and $S_{V1}$ to produce the sensor gate signal XSG (shown in FIG. 2F) of a frequency equal to the vertical scanning frequency $f_V$, and to produce the vertical shift clock pulses V1'–V4' (FIGS. 2G–2J). The sensor gate signal XSG is supplied to an output terminal 71 and the vertical shift clock pulses V1'–V4' are supplied to an output terminal 70. It is appreciated that output terminal 70 is comprised of four individual terminals, one for each of the vertical shift clock pulses.

Clock signal S1 supplied to input terminal 61 by source 51 also is coupled to a divide-by-two frequency divider 72. The frequency-divided output S2' of frequency divider 72 exhibits a frequency of $4f_{sc}$ and is gated by a gate circuit 73 to a phase adjusting circuit 74. A gate inhibit signal $S_{H3}$ is produced by horizontal ROM 65 and functions to close the gate circuit, thereby inhibiting the frequency-divided signal S2' from being supplied to phase adjusting circuit 74, during horizontal and vertical blanking intervals. As will be explained, frequency-divided signal S2' is used to produce horizontal shift pulses H1 and H2 which, as noted above, shift pixel charges through shift register 7. Since pixel charges are not shifted during the horizontal and vertical blanking intervals, inhibit signal $S_{H3}$ inhibits the operation of gate circuit 73 during such intervals. It will be appreciated that it is sufficient for inhibit signal $S_{H3}$ to close gate circuit 73 merely during the vertical blanking interval. Horizontal ROM 65 may include conventional gating and counting circuits for producing the inhibit signal $S_{H3}$. Alternatively, synchronizing circuit 64 may include a simple gate circuit which functions to gate the vertical synchronizing pulse VD to produce the inhibit signal $S_{H3}$.

Phase adjusting circuit 74 is adapted to produce horizontal shift pulses H1 and H2, pulse signal XPG and sampling pulses SHP and SHD, all described above in conjunction with FIGS. 6A–6G, in response to the gated frequency-divided signal S2'. As will be described in conjunction with FIG. 17, phase adjusting circuit 74 is adapted to impart propagation delays of predetermined amounts to each of the pulses produced thereby. These propagation delays may be selected so as to achieve a desired phase relationship among all of these pulses. Horizontal shift pulses H1 and H2 are supplied to output terminals 79 and 80 by way of clock driver circuits 781 and 782, respectively. It should be particularly noted that these clock driver circuits are included in timing pulse generator 60 and, thus, are fabricated on the same substrate used to form the timing pulse generator. Consequently, time delay errors which otherwise might occur if the pulse drivers are formed separately of the timing pulse generator are avoided.

One embodiment of horizontal ROM 65 now will be described in conjunction with FIG. 10. The horizontal ROM is comprised of an address counter 651 supplied with clock pulses CLKH applied thereto by frequency divider 67 (FIG. 9). Counter 651 also includes a reset input for receiving a reset pulse $P_{RH}$ generated by synchronizing circuit 64. The count of counter 651 is used as an address and is coupled to a ROM 652 to address successive storage locations in the ROM. Assuming each storage location in ROM 652 is capable of storing N bits, the ROM provides an N-bit parallel output in response to each address supplied thereto by counter 651. Three of those N bits ($N \geq 3$) provide the timing pulses $S_{H1}$, $S_{H2}$ and $S_{H3}$. A level change in one of these timing pulses is produced when the bit corresponding thereto changes from one level to the next in successively addressed storage locations. The time of occurrence of a transition thus may be altered simply by reprogramming ROM 652.

In accordance with one advantageous feature of the present invention, the capacity of ROM 652 and the counting capacity of counter 651 may be substantially reduced when compared to the capacities discussed above in conjunction with FIG. 8. For example, counter 651 may comprise a 7-bit counter capable of generating 128 addresses. Although the frequency of clock pulse CLKH is $2f_{sc}=455f_H$, ROM 652 need not be comprised of 455 storage locations to generate one or more of timing pulses $S_{H1}$–$S_{H3}$. It has been found that transitions in these timing pulses occur generally within the horizontal blanking period. As shown in FIG. 2C, timing pulse $S_{H1}$ remains substantially constant through most of its period until just before and then just after the horizontal blanking interval defined by horizontal synchronizing pulses HD. Likewise, timing pulse $S_{H2}$ remains substantially constant except for transitions that occur within a relatively short interval, as illustrated in FIG. 2D. Thus, data representing the signal levels of timing pulses $S_{H1}$, $S_{H2}$ and $S_{H3}$ need be provided only at those clock instants prior to and following a transition in the timing pulse. Such pulse level information is more than adequately represented by 128 storage locations. This means that, for timing pulse $S_{H1}$, as an example, the pulse data representing the requisite transitions at the proper times of occurrence are satisfactorily represented by 128 successive bits.

Figure 10:
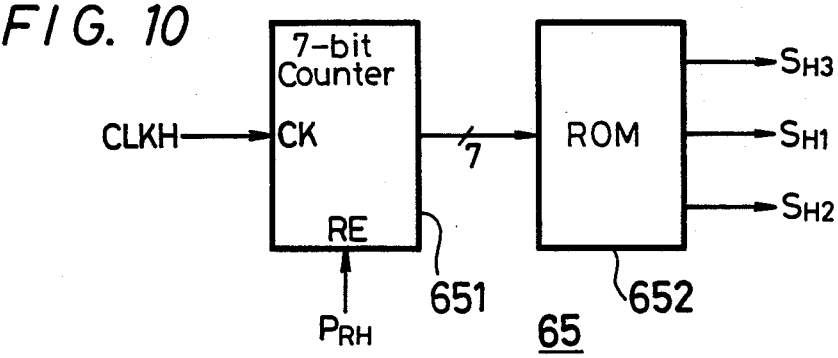
FIG. 10 is a block diagram of a ROM-implemented circuit for generating horizontal timing pulses.

Although not shown in FIGS. 9 and 10, synchronizing circuit 64 is adapted to supply an enable signal to counter 651 which functions to enable the counter to count the clock pulses CLKH only at those times which precede and follow transitions in timing pulses $S_{H1}$–$S_{H3}$. It is recognized that, at all other times, no transitions are present in these timing pulses and, thus, redundant data indicative of such constant levels need not be stored in or read from ROM 652. The enable signal thus may be of predetermined duration within and less than a horizontal line interval.

Of course, reset pulse $P_{RH}$ is used to reset counter 651 to its initial count at the beginning (or at any other convenient location) of a horizontal line interval.

Figure 11:
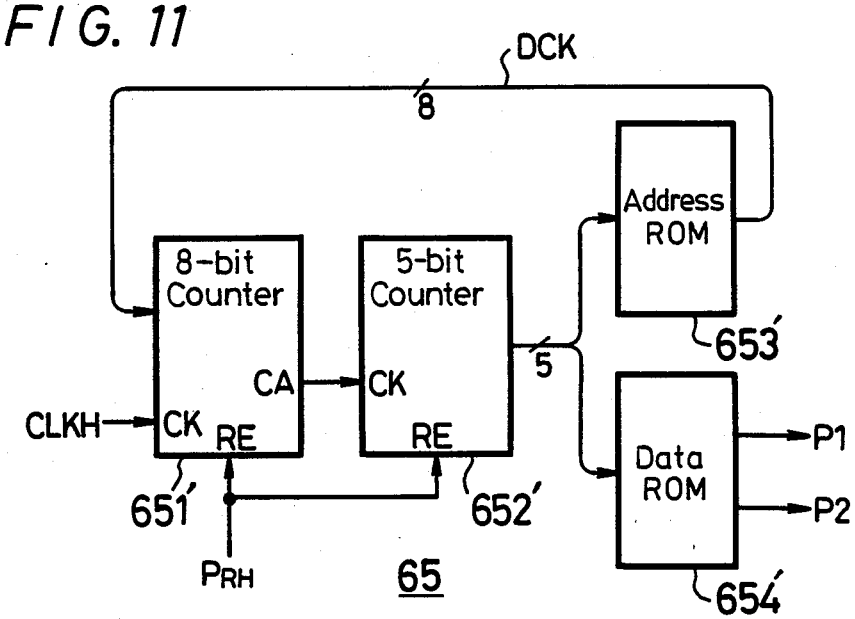
FIG. 11 is a block diagram of another embodiment of a ROM-implemented circuit for generating horizontal timing pulses.

An alternative embodiment to horizontal ROM 65 is illustrated in FIG. 11. In this alternative, two separate ROMs are used: an address ROM 653' and a data ROM 654'. Both the address ROM and the data ROM are coupled to an address counter 652' which generates successive addresses supplied concurrently to both ROMs as counter 652' is incremented. Counter 652' is coupled to another counter 651', referred to herein as an interval counter, for receiving a carry output pulse when counter 651' reaches its maximum count. Thus, counter 652' is adapted to count the carry pulses produced by counter 651', and counter 651' is adapted to count the clock pulses CLKH. Both counters are reset by the reset pulse $P_{RH}$ ROM 653' stores, at respective addressable locations, data representing respective interval durations. When such data DCK is read from address ROM 653', it is fed back to interval counter 651' to establish a counting scale corresponding to the interval duration DCK. In one embodiment, if counter 651' is an 8-bit counter capable of counting from 0 to 255, counter 651' is preset to a count of 255-n, wherein n represents an interval duration DCK read from the address ROM. As will be further appreciated, the count n represents the number of clock pulses CLKH that must be counted to establish the interval duration DCK read from address ROM 653'.

Data ROM 654' stores at each addresable location information representing the signal level of the respective timing pulses which are generated from the bits read out of the data ROM. It will be appreciated that data ROM 654' is addressed at a rate equal to the rate at which counter 652' is incremented; and counter 652' is incremented at a rate determined by n, the number of clock pulses CLKH that must be counted until counter 651' produces a carry pulse. This count n is, in turn, established by the interval duration data DCK read from address ROM 653'. In the preferred embodiment illustrated in FIG. 11, address counter 652' may be formed as a 5-bit counter, address ROM 653' and data ROM 654' may be provided with thirty-two addressable storage locations and interval counter 651' may be formed as an 8-bit counter.

It is appreciated that data ROM 654' functions to generate timing pulses $S_{H1}$, $S_{H2}$ and $S_{H3}$. For simplicity and to facilitate an understanding of the embodiment shown in FIG. 11, let it be assumed that the data ROM produces timing pulses p1 and P2 having the waveforms shown in FIGS. 12A and 12B, respectively. As illustrated, from a clock instant $T_1$ in which timing pulse p1 undergoes a positive transition, the next transition in the timing pulses occurs at clock instant $T_2$ whereat timing pulse P2 undergoes a negative transition. It is assumed that ten clock pulses CLKH must be counted by counter 651' to define the interval from time $T_1$ to $T_2$. Let it be further assumed that the next transition in the timing pulses occurs at clock instant $T_3$, whereat timing pulse p1 undergoes a negative transition. The interval from time $T_2$ to time $T_3$ is defined by fifteen clock pulses CLKH. Finally, let it be assumed that the next transition in timing pulses occurs six clock pulses CLKH following time $T_3$, at which time timing pulse P2 undergoes a positive transition.

Let it be further assumed that at time $T_1$ address counter 652' is incremented to an address count X. Address ROM 653' stores at address X interval duration data representing an interval equal to 10 clock pulses CLKH. Let it also be assumed that at address X in data ROM 654', the data bit representing timing pulse P1 is a binary "1" and the data bit representing timing pulse P2 also is a binary "1". It is further assumed that at the preceding address, data ROM 654' stores data bits P1="0" and P2="1".

Referring to the tables shown in FIGS. 13 and 14, when address counter 652' is incremented to count X +1, address ROM 653' has stored at address X +1 interval duration data corresponding to 15 clock pulses CLKH and data ROM 654' stores data bits P1="1" and P2="0" at this address. At address X+2, address ROM 653' stores interval duration data representing six clock pulses CLKH, as shown in FIG. 13, and at address X+2, data ROM 654' stores data bits p1="0" and P2="0", as shown in FIG. 14. Finally, at the next address in data ROM 654' (which may be assumed to be address X+3), data bits p1="0" and P2="1" are stored.

In operation, let it be assumed that data ROM 654' is at the state whereat p1="0" and P2="1" are read out. This occurs at a time prior to time $T_1$ in FIG. 12. Let it be further assumed that interval counter 651' produces a carry pulse at time $T_1$ to increment address counter 652' to the count X. At this time $T_1$, interval duration data DCK is read from address ROM 653' to preset interval counter 651' to a count of, for example, 255−10. At this time $T_1$, data bits p1="1" and P2="1" are read from data ROM 654'. The transition in timing pulse p1 is illustrated in FIG. 12A.

After ten clock pulses CLKH are counted by interval counter 651', this counter supplies a carry pulse to address counter 652', thereby incrementing the address counter to the count X +1. Now, interval data DCK representing an interval duration of fifteen clock pulses is read from address ROM 653' to preset interval counter 651' to the count of 255−15. Also, timing pulse signal levels p1="1" and P2="0" are read from data ROM 654'. As shown in FIG. 12B, timing pulse P2 undergoes a negative transition at this time $T_2$.

Interval counter 651' now counts fifteen clock pulses CLKH and then supplies address counter 652' with a carry pulse. The address counter is implemented to the count X+2 and interval duration data DCK representing six clock pulses now is read from address ROM 653'. Interval counter 651' is preset to the count 255−6. Also, at this time $T_3$, the signal level of timing pulse p1 is changed to a "0" and the signal level of timing pulse P2 remains at "0". Thus, a negative transition in timing pulse p1 is produced, as shown in FIG. 12A.

Interval counter 651' counts six clock pulses CLKH and then supplies address counter 652' with a carry pulse. The address counter thus is incremented to its next count (assumed to be X+3); and data ROM 654' reads from this next address data bits p1="0" and P2="1". Thus, a positive transition is provided in timing pulse P2, as shown in FIG. 12B. The foregoing operation then is repeated; and it is seen that if address counter 652' is a 5-bit counter, thirty-two different interval durations may be stored in address ROM 653' and up to thirty-two different signal levels for each of timing pulses p1 and P2 may be stored in data ROM 654'. By using these separate address and data ROMs, the capacity of each ROM may be reduced significantly and a relatively small counter may be use as address counter 652'. Nevertheless, sufficient information is stored to produce accurate timing pulses; and the extent of the durations stored in address ROM 653' as well as the phase relationships of the timing pulses may be changed easily by simply reprogramming the ROMs.

Figure 15:
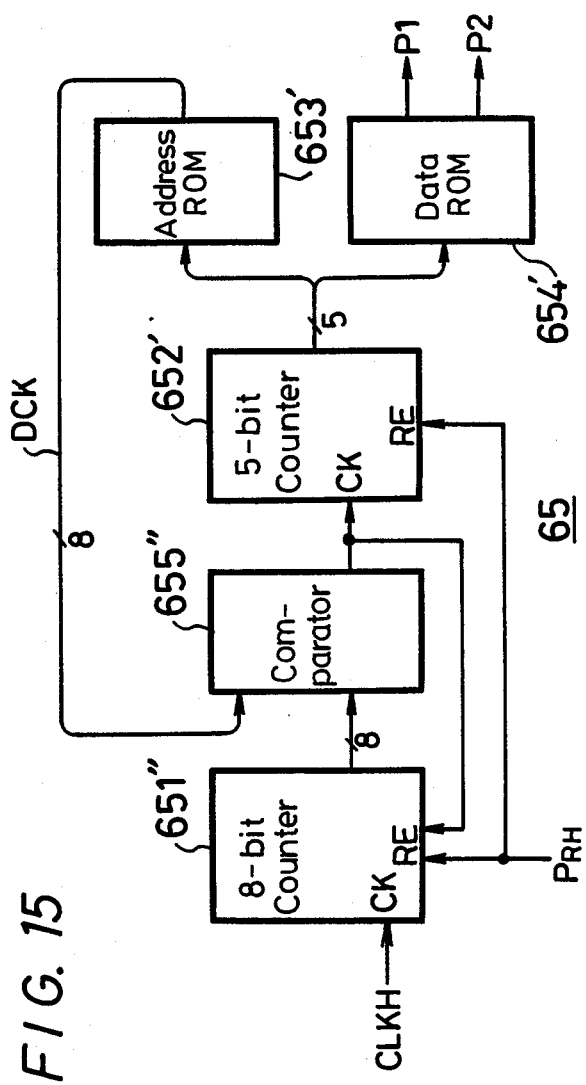
FIG. 15 is a block diagram of an alternative embodiment to the ROM-implemented circuit shown in FIG. 11.

An alternative to the embodiment shown in FIG. 11 is represented by the block diagram of FIG. 15. Horizontal ROM 65 is seen to be quite similar to the embodiment just described, except that a comparator 655" is used in place of presettable counter 651'. In the FIG. 15 embodiment, interval counter 651" provides an output count to comparator 655" which compares this interval count to the interval duration data DCK read from address ROM 653'. When the compared counts are equal, or otherwise correspond to each other, comparator 655" produces an output pulse to increment address counter 652' and to reset interval counter 651". Thus, interval counter 651" counts n clock pulses CLKH, and when this count n is reached, comparator 655" senses that the count n of interval counter 651" is equal to the count n read from address ROM 653' which, in turn, defines the interval duration. At that time, address counter 652' is incremented and interval counter 651" is reset and the foregoing operation is repeated.

Figure 16:
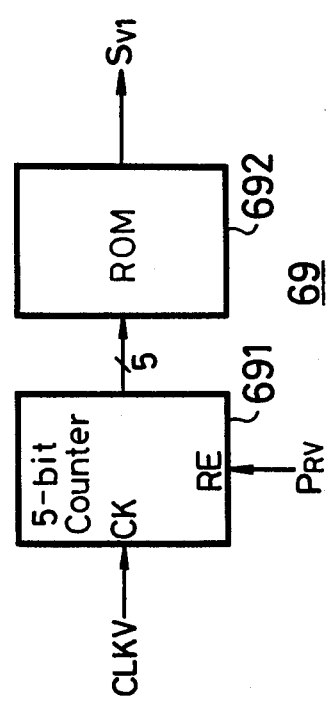
FIG. 16 is a block diagram of a ROM-implemented circuit for generating vertical timing pulses.

Vertical ROM 69 may be similar to the aforedescribed embodiments of horizontal ROM 65. As one example, the vertical ROM may be formed of an address counter 691 and a ROM 692, as shown in FIG. 16. It is appreciated that the embodiment shown in FIG. 16 is quite similar to that discussed above in conjunction with the FIG. 10 embodiment of horizontal ROM 65. Accordingly, it will be recognized that counter 691 counts clock pulses CLKV, and each count exhibited by the counter is used to address ROM 692. ROM 692 produces timing pulse $S_{V1}$, shown in FIG. 2E, having a repetition rate equal to the vertical scanning frequency $f_v$. Although a frame interval in the NTSC system is formed of 525 lines, ROM 692 need not include 525 addressable locations. Rather, and as was discussed above in conjunction with FIG. 10, the storage capacity of ROM 692 need be sufficient to store timing pulse signal level information which precedes and follows the transitions of timing pulse $S_{V1}$. At all other times, the timing pulse signal level remains at a constant "1" or "0"; and it is not necessary to store such redundant information in the ROM. It has been found that thirty-two storage locations are sufficient and, therefore, address counter 651 can be formed as a 5-bit counter.

Although not shown, synchronizing circuit 64 may supply an enable signal to address counter 691 during, for example, the vertical blanking interval so as to enable the counter to address ROM 692 only during the interval in which transitions in timing pulse $S_{V1}$ are produced. This interval is shown in FIG. 2E. The enable signal thus may be of predetermined duration within and less than the vertical blanking interval.

Figure 17:
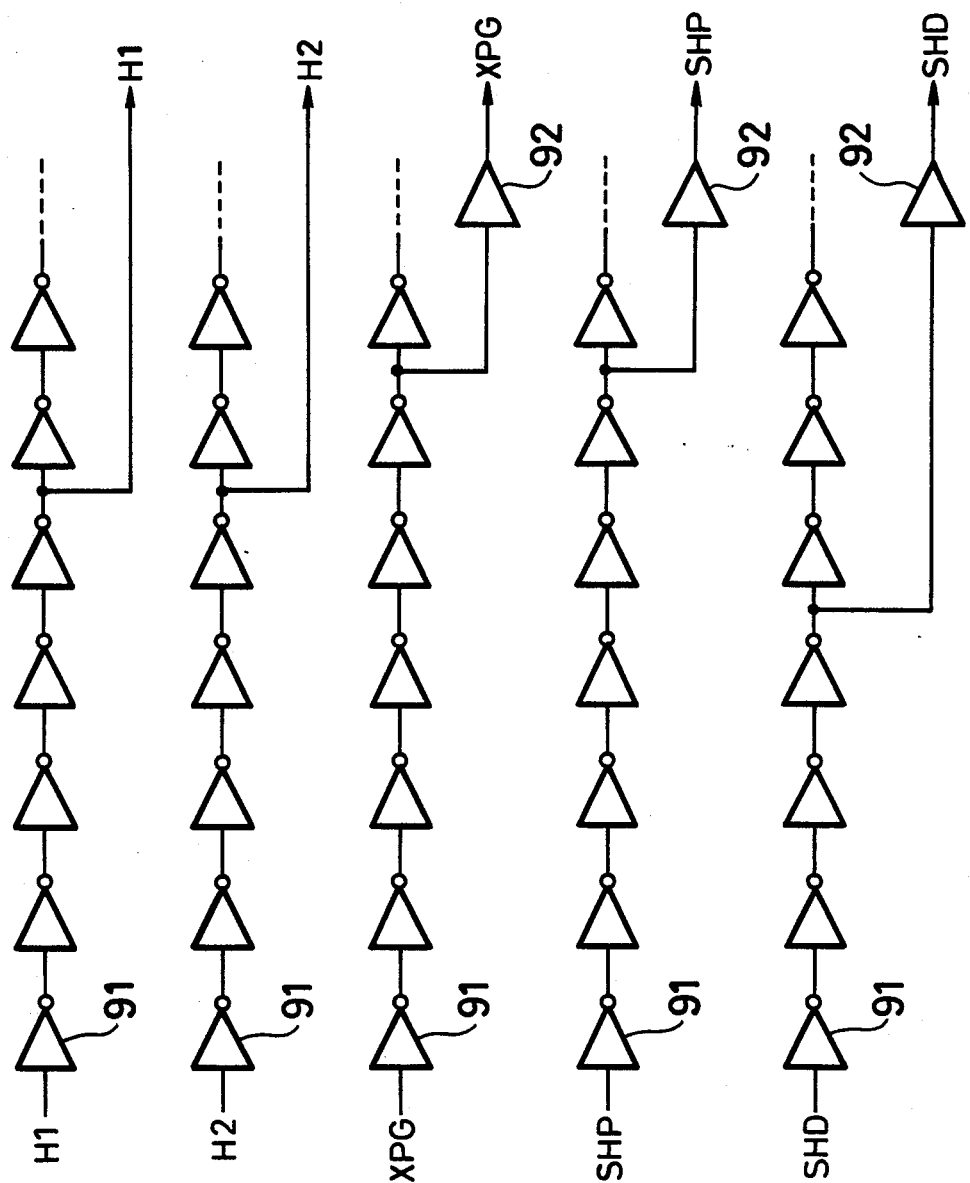
FIG. 17 is a logic diagram of one embodiment of a phase adjusting circuit incorporated into the timing pulse generator shown in FIG. 9.

Turning now to FIG. 17, there is illustrated a preferred embodiment of a delay circuit that may be used in phase adjusting circuit 74 to impart selected, incremental time delays to horizontal transfer pulses H1 and H2, to pulse XPG (used to produce the reset pulse PG) and to sampling pulses SHP and SHD. Each time delay circuit is comprised of series-connected inverters, shown as inverters 91, with each inverter exhibiting an inherent propagation delay. Each inverter is of substantially identical construction and formed on the same integrated circuit chip such that the propagation delay in each is substantially identical. Moreover, the interconnection length between adjacent inverters is the same from one time delay circuit to the next so that the capacitance attributed to such interconnection also is the same. Preferably, such interconnection length is made as short as possible to reduce maximum differences in interconnection length and, thus, capacitance from one time delay circuit, and from one timing pulse generator, to another. In fabrication, each time delay circuit formed of interconnected inverter circuits is treated as one cell, and the mask and layout of all cells preferably is the same. Thus, the overall time delay imparted to a timing pulse is determined by the particular inverter circuit to which an output lead is connected. A change in time delay, resulting in a phase change, is achieved simply by connecting the cell output to a different inverter circuit.

As shown in FIG. 17, assuming identical delay cells, the time delay imparted to sampling pulse SHP is equal to the time delay imparted to pulse XPG which is greater than the time delay imparted to horizontal transfer pulses H1 and H2 which is greater than the time delay imparted to sampling pulse SHD. Output buffers 92 are used to provide current amplification and, if necessary, voltage amplification, to sampling pulses SHP and SHD and to pulse XPG. These buffers are integrally formed with the respective time delay cells.

As mentioned above, timing pulse generator 60 is formed as an integrated circuit on a common substrate using multilayer interconnection for connecting the various components included in the timing pulse generator. Advantageously, the time delay circuitry included in phase adjusting circuit 74 is formed as the topmost layer of the integrated circuit and is made of 2Al. Accordingly, if phase adjustments in any one or more of the timing pulses are needed, the 2Al mask may be changed easily so as to change the particular inverter circuit that is connected to the cell output. From FIG. 17, it is seen that a greater time delay and, thus, a greater phase shift is produced if a greater number of inverter circuits are interposed between the input and out of a cell.

Figure 19:
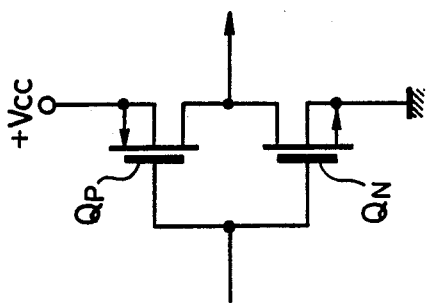
FIG. 19 is a schematic diagram of an inverter element used in the pulse driver of FIG. 18.
Figure 18:
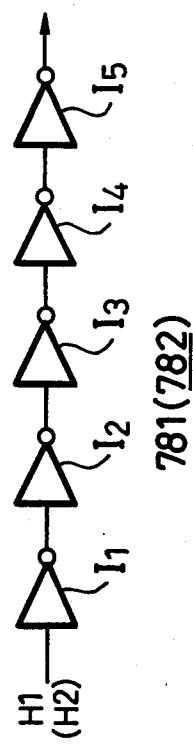
FIG. 18 is a logic diagram of a pulse driver incorporated into the timing pulse generator shown in FIG. 9.

Pulse drivers 781 and 782 also are formed on the same integrated circuit chip as the remaining components of timing pulse generator 60. FIG. 18 is a schematic representation of each of these pulse drivers and, advantageously, each pulse driver is formed of series-connected inverter circuits $I_1$–$I_5$. One embodiment of an inverter circuit used in FIG. 18 is illustrated in FIG. 19 and is comprised of a P-channel MOSFET $Q_P$ connected with an N-channel MOSFET $Q_N$. Advantageously, the channel width of the MOSFETs included in the inverter located at the input end of the series connection shown in FIG. 18 is less than the channel width of the MOSFETS located at the output end of this series. In one embodiment, the channel widths of the MOSFETS are increased gradually until the channel width at the output is approximately three times the channel width at the input. Nevertheless, the length of the channel of each MOSFET is maintained substantially the same. As a result, the driving ability of the illustrated pulse driver is improved.

By providing pulse drivers 781 and 782 on the same substrate as timing pulse generator 60, the phase relationship between sampling pulses SHP and SHD and horizontal clock pulses H1 and H2 remain constant from one timing pulse generator to another, and even if the timing pulse generator is used under different temperature conditions. Consequently, only the inherent delay exhibited by CCD device 1 must be accounted for in sample-and-hold output circuit 20. This same advantage may be enjoyed by fabricating pulse driver 35 on the same substrate used to fabricate timing pulse generator 60. However, since the signal level of the reset pulse PG produced by pulse driver 35 must be sufficient to reset capacitor 12 of CCD device 1 (FIG. 1), it is preferred to construct pulse driver 35 as a separate external circuit energized by a different power source to insure a sufficient signal level.

While the present invention has been particularly shown and described with reference to preferred embodiments, it will be readily appreciated by those of ordinary skill in the art that various changes and modifications may be made without departing from the spirit and scope of the invention. For example, conventional low capacity and, thus, inexpensive ROMs may be used in the horizontal and vertical ROM circuits. Furthermore, there is no technical limitation on the number of bits stored at each addressable location of each ROM; and conventional low-cost 8-bit ROMs, or the like, may be used.

It is intended that the appended claims be interpreted as including the embodiments disclosed herein, the foregoing additions and all equivalents to the disclosed invention.

What is claimed is:

1. A timing pulse generator for generating at least first and second timing pulses exhibiting vertical and horizontal scanning frequencies, respectively, typical of video signals, the timing pulses being adapted for use with a CCD imaging device, said timing pulse generator comprising:
   a source of first reference pulses having the horizontal scanning frequency;
   first counting means for counting said first reference pulses to produce a first address count;
   first ROM means having a read only memory with first timing pulse data stored therein and supplied with said first address count to read out said first timing pulse data from addressed locations to generate first timing pulses;
   a source of second reference pulses of a frequency substantially higher than said horizontal scanning frequency;
   second counting means for counting said second reference pulses to produce a second address count; and
   second ROM means having a read only memory with second timing pulse data stored therein and supplied with said second address count to read out said second timing pulse data from addressed locations to generate second timing pulses.

2. The timing pulse generator of claim 1 wherein said CCD imaging device includes charge generating means for generating charges representing an image and vertical shift registers for shifting charges therein transferred from said charge generating means; and said timing pulse generator further comprises clock generating means coupled to said first and second ROM means and responsive to said first and second timing pulses for generating charge transfer and vertical shift clock pulses for said vertical shift registers to transfer and shift charges therein.

3. The timing pulse generator of claim 1 wherein said second ROM means includes a data ROM for storing in addressable locations data information representing data levels of said second timing pulses at respective clock instants, and an interval ROM for storing in addressable locations interval information representing the durations of respective intervals between transitions in the data levels of said second timing pulses; and wherein said second counting means comprises an interval counter for counting a number of said second reference pulses corresponding to an interval duration read from said interval ROM, and a ROM address counter incremented when said interval counter counts said number of second reference pulses to address said interval ROM and said data ROM, whereby the interval information stored in the interval ROM at the addressed location is read to establish the interval duration until the ROM address counter is next incremented and the data information stored in the data ROM at the addressed location is read to establish respective data levels following a transition in said second timing pulses.

4. The timing pulse generator of claim 3 wherein said data ROM stores plural bits at each addressable location, each bit representing the level of a respective one of said second timing pulses following each transition in the second timing pulses.

5. The timing pulse generator of claim 4 wherein said ROM address counter is coupled to said interval ROM and said data ROM to address both concurrently, whereby the interval information read from said interval ROM establishes the interval duration until the next transition in the second timing pulses and the data bits read from said data ROM establish the respective levels of said second timing pulses following the present transition.

6. The timing pulse generator of claim 3 wherein said interval counter comprises a presettable counter preset to a count determined by the interval information read from the interval ROM for counting said second reference pulses from the preset count to produce a carry output pulse when said number has been counted, said carry output pulse being supplied to and counted by said ROM address counter.

7. The timing pulse generator of claim 3 wherein said interval counter includes comparator means for comparing the count of said interval counter to a count determined by the interval information read from the interval ROM to produce an output pulse when the compared counts correspond to each other, said output pulse being supplied to and counted by said ROM address counter and being supplied to reset said interval counter.

8. The timing pulse generator of claim 1 wherein said second ROM means includes a data ROM for storing at addressable locations bits representing data levels of said second timing pulses at respective clock instants; said second counting means includes enable means responsive to an enable signal for counting said second reference pulses; and further including a source of horizontal synchronizing pulses for producing an enable signal of predetermined duration less than a horizontal scanning period.

9. The timing pulse generator of claim 1 wherein said first ROM means includes a data ROM for storing at addressable locations bits representing data levels of said first timing pulses at respective clock instants; said first counting means includes enable means responsive to an enable signal for counting said first reference pulses; and further including a source of horizontal and vertical synchronizing pulses for producing an enable signal of predetermined duration within and less than a vertical blanking interval.

10. The timing pulse generator of claim 1 further comprising means responsive to said source of second reference pulses for generating horizontal shift pulses adapted to transfer a line interval of image charges produced by said CCD imaging device; and phase shifting means for shifting the phase of said horizontal shift pulses.

11. The timing pulse generator of claim 10 wherein said phase shifting means comprises a series of logic inverter circuits, each exhibiting an inherent propagation delay to produce a phase shift substantially equal to the sum of the individual delays of those logic inverter circuits connected in series.

12. The timing pulse generator of claim 11 wherein the generator is formed as an integrated circuit having a common substrate and multilayer interconnections, and wherein said series of logic inverter circuits is provided with interconnections between said circuits as the topmost layer of said integrated circuit; whereby a change in the series connection of said logic inverter circuits is achieved by changing a mask used to form said topmost layer.

13. The timing pulse generator of claim 12 further comprising pulse drive means formed on said common substrate and connected to said series of logic inverter circuits for increasing the power level of said horizontal shift pulses.

* * * * *